US010625733B2

(12) United States Patent
Cheaz et al.

(10) Patent No.: US 10,625,733 B2
(45) Date of Patent: Apr. 21, 2020

(54) DELAYED PARKING OPTIMIZATION OF AUTONOMOUS VEHICLES

(71) Applicant: International Business Machines Corporation, Armonk, NY (US)

(72) Inventors: Nixon Cheaz, Cary, NC (US); Anthony Diaz, Durham, NC (US); Michael E. Head, Cary, NC (US); Jordana H. Kerr, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 15/489,730

(22) Filed: Apr. 18, 2017

(65) Prior Publication Data

US 2018/0297588 A1 Oct. 18, 2018

(51) Int. Cl.
| | |
|---|---|
| *B60W 30/06* | (2006.01) |
| *B60W 30/18* | (2012.01) |
| *B60W 10/18* | (2012.01) |
| *B60W 10/20* | (2006.01) |
| *G05D 1/00* | (2006.01) |
| *B62D 15/02* | (2006.01) |
| *B60W 40/08* | (2012.01) |

(52) U.S. Cl.
CPC ............ *B60W 30/06* (2013.01); *B60W 10/18* (2013.01); *B60W 10/20* (2013.01); *B60W 30/18* (2013.01); *B62D 15/027* (2013.01); *B62D 15/0285* (2013.01); *G05D 1/0088* (2013.01); *B60W 2040/0881* (2013.01); *B60W 2550/10* (2013.01); *B60W 2710/18* (2013.01); *B60W 2710/20* (2013.01); *B60W 2750/00* (2013.01)

(58) Field of Classification Search
CPC ...... B60W 30/06; B60W 10/20; B60W 10/18; B60W 30/18; B60W 2710/20; B60W 2710/18; B60W 2550/10; B60W 2750/00; B60W 2040/0881; B62D 15/0285; B62D 15/027; G05D 1/0088
See application file for complete search history.

(56) References Cited

U.S. PATENT DOCUMENTS

| 8,610,597 B2 | 12/2013 | Stefik et al. |
| 8,868,329 B2 | 10/2014 | Ikeda et al. |
| (Continued) | | |

*Primary Examiner* — Nadeem Odeh
*Assistant Examiner* — Michael V Kerrigan
(74) *Attorney, Agent, or Firm* — Steven M. Greenberg, Esq.; Shutts & Bowen LLP

(57) ABSTRACT

A method for the delayed parking optimization of an autonomous vehicle includes activating a delayed parking optimization mode in a vehicle and, during the delayed parking optimization mode, detecting a presence of one or more passengers in the vehicle. On condition that no further passengers are detected in the vehicle, a delay period is initiated subsequent to which the vehicle engages the transmission of the vehicle from park to reverse, applies power to cause the vehicle to back out of the parking spot onto the roadway, engages the transmission into drive, applies power and manages steering and braking of the vehicle in order to navigate the vehicle forward on the roadway beyond the parking spot, engages the transmission into reverse, applies power and manages steering of the vehicle to cause the vehicle to back into the parking spot and engages the transmission of the vehicle into park.

9 Claims, 1 Drawing Sheet

(56) References Cited

U.S. PATENT DOCUMENTS

| | | | | |
|---|---|---|---|---|
| 9,739,226 B2* | 8/2017 | Elwart | .................. | B60K 28/04 |
| 2013/0166190 A1* | 6/2013 | Ikeda | ................. | B62D 15/0285 |
| | | | | 701/400 |
| 2015/0039213 A1 | 2/2015 | Stefan et al. | | |
| 2015/0154669 A1 | 6/2015 | Wu et al. | | |
| 2016/0155331 A1 | 6/2016 | Mielenz | | |
| 2017/0253237 A1* | 9/2017 | Diessner | ............... | B60W 10/02 |
| 2017/0329346 A1* | 11/2017 | Latotzki | ............ | B62D 15/0285 |

* cited by examiner

DELAYED PARKING OPTIMIZATION OF AUTONOMOUS VEHICLES

BACKGROUND OF THE INVENTION

Field of the Invention

The present invention relates to vehicle telematics and more particularly to automated vehicle parking assistance.

Description of the Related Art

Telematics is an interdisciplinary field of study that encompasses telecommunications, vehicular technologies, road transportation, road safety, electrical engineering inclusive of sensors, instrumentation, and wireless communications, and computer science. An intelligent vehicle technology refers to a telematic arrangement of one or more electronic, electro-mechanical and electromagnetic devices, including different sensors disposed externally from and internally to a vehicle, operating in concert along with a radio transceiver to provide vehicle command and control and information services. Modern intelligent vehicle technology products primarily focus upon vehicular safety and hazard warning as well as traffic and navigation.

Parking assistance systems relate to intelligent vehicle technologies in so far as parking assistance systems facilitate the location of an available parking space and, through the use of telematics, facilitate the placement of a vehicle into a parking space. Indeed, for several years, advanced parking assistance systems have been able to provide for the automated parking of a vehicle without human intervention. Yet, most commercially successful parking assistance systems address the need to manage a parking lot or parking garage by locating available parking spaces and publishing a count of available spaces for viewing by a motorist.

In this regard, a general implementation of a parking assistance system utilizes digital camera technology and content based image retrieval technologies so as to identify one or more different available parking spaces in a parking lot. Different light emitting diode (LED) lighting systems are coupled to a controller receiving and reducing acquired imagery so as to guide a motorist to an available parking space. However, as it will be understood, conventional parking assistance systems are vehicle agnostic and driver agnostic. Instead, conventional parking assistance systems are simply one-dimensional in respect to the binary determination of whether or not a parking space is occupied.

Of note, a parking space may be characterized as a parallel parking space, an angled parking space, or a perpendicular parking space. In the case of an angled or perpendicular parking space, either separate points of entry and egress are provided opposite to one another, or a single point of entry and egress is provided where a curb, wall, parking block, parking barrier, or another vehicle inhibit egress opposite the point of ingress. In the circumstance when parking a car in a parking space in which only one point of entry is provided, there are generally two options. In one option, the car may enter the parking space nose first, or the car may enter the parking space rear end first. When entering a parking space nose first, to exit the parking space, a three-point maneuver is required whilst backing out of the parking space. Conversely, when entering a parking space rear end first, a three-point maneuver is required whilst backing into the parking space. As it will be understood, backing out of a parking space can be more difficult than pulling out of the same parking space nose first. But, backing into a parking space can also be a challenging exercise more so than merely pulling into the same parking spot nose first.

BRIEF SUMMARY OF THE INVENTION

Embodiments of the present invention address deficiencies of the art in respect to automated self-parking of a vehicle and provide a novel and non-obvious method, system and computer program product for the delayed parking optimization of an autonomous vehicle. The method includes activating a delayed parking optimization mode in a vehicle. Then, during the delayed parking optimization mode, a presence of one or more passengers in the vehicle is detected. On condition that no further passengers are detected in the vehicle, a delay period is initiated subsequent to which the vehicle engages a transmission of the vehicle from a parked stated into a reverse mode, applies power to cause the vehicle to back out of the parking spot while managing steering and braking of the vehicle in order to navigate the vehicle onto the roadway, engages the transmission of the vehicle into a drive mode, applies power and manages steering and braking of the vehicle in order to navigate the vehicle forward on the roadway beyond the parking spot, engages the transmission of the vehicle into a reverse mode, applies power and manages steering of the vehicle to cause the vehicle to back into the parking spot from the roadway and engages the transmission of the vehicle into a parked state.

In one aspect of the embodiment, the vehicle applies braking responsive to detecting an object proximate to the vehicle in the roadway. In another aspect of the embodiment, the delay period is computed based upon a time frame during which the vehicle is to be re-parked and a duration of time required to perform re-parking. In yet another aspect of the embodiment, the delay period is computed based a threshold period of time during which no other vehicles on the roadway are detected in proximity to the vehicle. In even yet another aspect of the embodiment, on condition that breaking is applied responsive to detecting an object proximate to the vehicle as the vehicle pulls out of the parking spot, engaging the transmission of the vehicle in drive mode, power is applied and steering and braking managed so as to cause the vehicle to pull back into the parking spot nose first.

In another embodiment of the invention, a data processing system is configured for delayed parking optimization of an autonomous vehicle. The system includes a host computing platform mounted in a vehicle and comprising memory and at least one processor. The system also includes a delayed parking optimization module including computer program instructions executing in the memory of the host computing platform. The instructions upon execution activate a delayed parking optimization mode in the vehicle, and during the delayed parking optimization mode, detect a presence of one or more passengers in the vehicle. On condition that no further passengers are detected in the vehicle, a delay period is initiated subsequent to which the vehicle engages a transmission of the vehicle from a parked stated into a reverse mode, applies power to cause the vehicle to back out of the parking spot while managing steering and braking of the vehicle in order to navigate the vehicle onto the roadway, engages the transmission of the vehicle into a drive mode, applies power and manages steering and braking of the vehicle in order to navigate the vehicle forward on the roadway beyond the parking spot, engages the transmission of the vehicle into a reverse mode, applies power and manages steering of the vehicle to cause the vehicle to back into the parking spot from the roadway and engages the transmission of the vehicle into a parked state.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for delayed parking optimization of an autonomous vehicle. In accordance with an embodiment of the invention, a vehicle traverses a roadway and executes a turn into a parking spot coming to a stop. The passengers in the vehicle exit the vehicle and the vehicle detects no passengers remaining in the vehicle. In response to detecting no remaining passengers in the vehicle, a delay is incurred. Subsequent to the delay, the vehicle autonomously without passengers engages a transmission of the vehicle from a parked stated into a reverse mode, applies power to cause the vehicle to back out of the parking spot while manages steering and braking of the vehicle in order to navigate the vehicle onto the roadway. Then, the vehicle engages the transmission of the vehicle into a drive mode, applies power and manages steering and braking of the vehicle in order to navigate the vehicle forward on the roadway beyond the parking spot. Finally, the vehicle engages the transmission of the vehicle into a reverse mode, applies power and manages steering of the vehicle to cause the vehicle to back into the parking spot from the roadway. Finally, the vehicle engages the transmission of the vehicle into a parked state. In this way, the operator of the vehicle is able to most efficiently and quickly park the vehicle in the parking spot by parking head-on into the parking space, while also allowing the operator of the vehicle to exit the parking space most efficiently and quickly. But the most disruptive aspect of backing into the parking spot can be deferred until a time when the parking lot is less busy and the operator no longer present at the vehicle.

Figure 1:
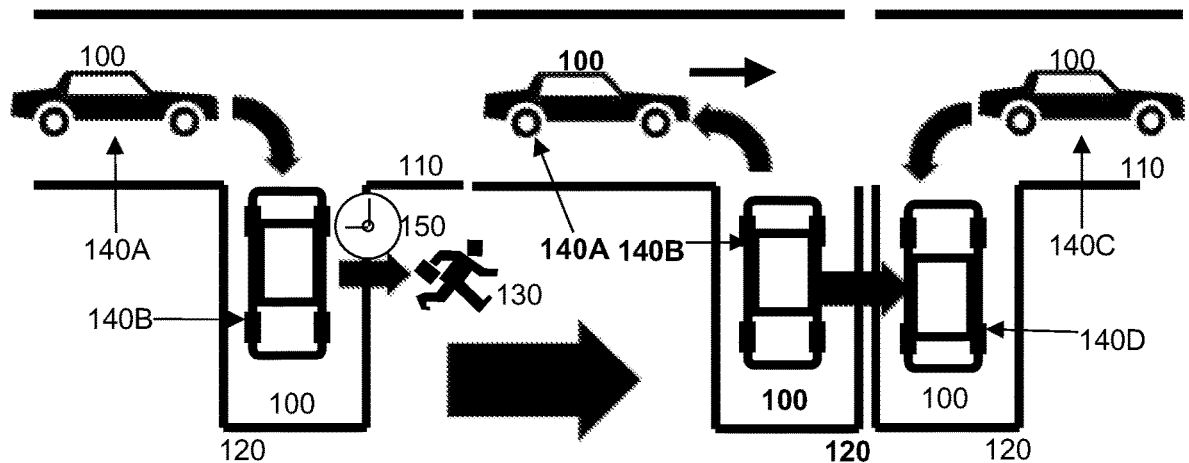
FIG. 1 is a pictorial illustration of a process for the delayed parking optimization of an autonomous vehicle.

In further illustration, FIG. 1 pictorially shows a process for the delayed parking optimization of an autonomous vehicle. As shown in FIG. 1, a vehicle 100 adapted for delayed parking optimization traverses a roadway 110 and approaches a parking space 120 in an approaching posture 140A. Then, the vehicle 100 enters the parking space 120 and completes parking in a nose-first parking posture 140B. The vehicle 100 then waits as one or more passengers 130 egress the vehicle 100.

When no further passengers 130 are detected within the vehicle, a delay is incurred. Subsequent to the delay, the vehicle 100 autonomously transitions from the nose-first parking state 140B to the approaching posture 140A by backing out of the space 120 into the roadway 110. Then, the vehicle 100 autonomously pulls forward in the roadway 110 past the parking space 120 into an advanced posture 140C. Finally, the vehicle 100 autonomously backs into the parking space 120 into a rear-first parking posture 140D.

Figure 2:
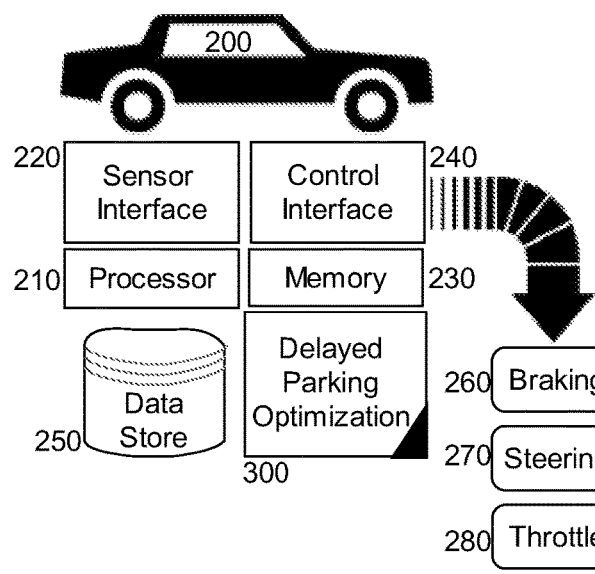
FIG. 2 is a schematic illustration of a data processing system configured for delayed parking optimization of an autonomous vehicle; and, FIG. 3 is a flow chart illustrating a process for delayed parking optimization of an autonomous vehicle.

The process described in connection with FIG. 1 may be implemented in a data processing system. In yet further illustration, FIG. 2 schematically shows a data processing system configured for delayed parking optimization of an autonomous vehicle. The system is disposed in a vehicle 200 and includes one or more processors 210 and memory 230. The system also includes a data store 250. The system yet further includes a sensor interface 220 through which sensor data regarding the state and movement of the vehicle 200 and other objects proximate to the vehicle 200 are received for processing by the processor 210.

Finally, the system includes a control interface 240 adapted to issue directives to braking 260, steering 270 and throttle 280 controls of the vehicle 200 so as to control the movement of the vehicle 200. To that end, a pattern of directives may be stored in data store 250 determined to effectuate both backing out of a parking space and also backing into a parking space. The pattern of directives may be variably responsive to data sensed by sensors of the vehicle 200 through the sensor interface 220 including the dimensions of the parking space and the presence of objects and other vehicles within the path of movement of the vehicle 200.

Importantly, a delayed parking optimization module 300 is included as part of the system. The delayed parking optimization module 300 includes program code enabled upon execution in the memory 230 by the processor 210 to respond to an activation of a delayed parking optimization mode in the vehicle 200 by detecting a presence of one or more passengers in the vehicle 200 and, on condition that no further passengers are detected in the vehicle 200, initiating a delay period subsequent to which the vehicle 200 engages a transmission of the vehicle from a parked stated into a reverse mode, directs power through the throttle 280 to cause the vehicle 200 to back out of the parking spot while managing steering 270 and braking 280 of the vehicle 200 in order to navigate the vehicle 200 onto the roadway, engages the transmission of the vehicle 200 into a drive mode, applies power through the throttle 280 and manages steering 270 and braking 260 of the vehicle 200 in order to navigate the vehicle 200 forward on the roadway beyond the parking spot, engages the transmission of the vehicle 200 into a reverse mode, applies power through the throttle 280 and manages steering 270 of the vehicle 200 to cause the vehicle 200 to back into the parking spot from the roadway and engages the transmission of the vehicle 200 into a parked state.

Figure 3:
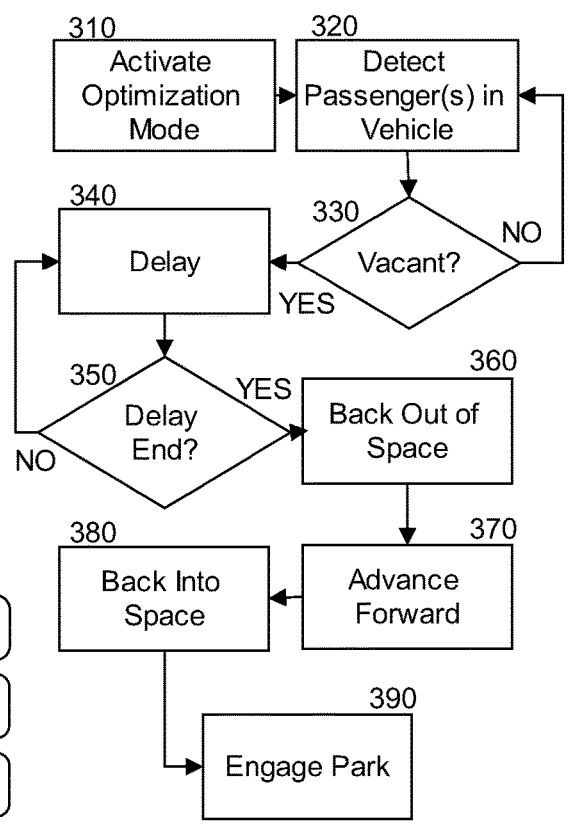

In yet further illustration of the operation of the delayed parking optimization module 300, FIG. 3 is a flow chart illustrating a process for delayed parking optimization of an autonomous vehicle. Beginning in block 310, an optimization mode is activated in the vehicle. In block 320, one or more passengers are detected as being present in the vehicle. In decision block 330, it is determined if any passengers remain in the vehicle. If not, in block 340 a delay period ensues in which no action is take with respect to the movement of the vehicle during the delay period. In this regard, the delay period may be computed based upon a time frame during which the vehicle is to be re-parked and a duration of time required to perform re-parking. Alternatively, the delay period may be computed based a threshold period of time during which no other vehicles on the roadway are detected in proximity to the vehicle.

In decision block 350, it is determined if the delay period has ended. If not, the delay continues in block 340. Otherwise, the process continues in block 360. Specifically, in block 360, the vehicle autonomously backs out of the parking space onto the roadway. Optionally, the vehicle applies braking responsive to detecting an object proximate to the vehicle in the roadway. As another option, on condition that breaking is applied responsive to detecting an object proximate to the vehicle within the path of the vehicle, as the vehicle pulls out of the parking spot, the transmission of the vehicle may be engaged in drive mode, and power applied while steering and braking is managed to cause the vehicle to pull back into the parking spot nose first. In any event, if no object is detected proximate to the vehicle within the path of the vehicle, in block 370 the vehicle autonomously pulls forward on the roadway beyond the parking space. Then, in block 380 the vehicle autonomously backs into the parking space from the roadway. Finally, in block 390 the vehicle autonomously engages a parking state with respect to the transmission of the vehicle.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for delayed parking optimization of an autonomous vehicle, the method comprising:
    activating a delayed parking optimization mode in a vehicle while the vehicle is already parked in a parking spot in a nose-first parking posture and while one or more passengers are detected in the vehicle; and,
    during the delayed parking optimization mode, detecting a lack of presence of passengers in the vehicle and, on condition that no passengers are detected in the vehicle, initiating a delay period computed based upon a threshold period of time during which no other vehicles on a roadway are detected in proximity to the vehicle subsequent to which a vehicle engages a transmission of the vehicle from a parked stated into a reverse mode, applies power to cause the vehicle to back out of the parking spot while managing steering and braking of the vehicle in order to navigate the vehicle onto the roadway, engages the transmission of the vehicle into a drive mode, applies power and manages steering and braking of the vehicle in order to navigate the vehicle forward on the roadway beyond the parking spot, engages the transmission of the vehicle into the reverse mode, applies power and manages steering of the vehicle to cause the vehicle to back into the parking spot from the roadway and engages the transmission of the vehicle into the parked state comprising a rear-first parking posture.

2. The method of claim 1, wherein the vehicle applies braking responsive to detecting an object proximate to the vehicle in the roadway.

3. The method of claim 2, wherein on condition that braking occurs responsive to detecting the object proximate to the vehicle as the vehicle pulls out of the parking spot, engaging the transmission of the vehicle in drive mode, applying power and managing steering and braking to cause the vehicle to pull back into the parking spot nose first.

4. A data processing system configured for delayed parking optimization of an autonomous vehicle, the system comprising:
    a host computing platform mounted in the autonomous vehicle and comprising a non-transitory memory and at least one processor; and,
    a delayed parking optimization module comprising computer program instructions executing in the at least one processor of the host computing platform, the instructions upon execution activating a delayed parking optimization mode in the vehicle while the vehicle is already parked in a parking spot in a nose-first parking posture and while one or more passengers are detected in the vehicle, and during the delayed parking optimization mode, detecting a lack of presence of passengers in the vehicle and, on condition that no passengers are detected in the vehicle, initiating a delay period computed based upon a threshold period of time during which no other vehicles on a roadway are detected in proximity to the vehicle subsequent to which the vehicle engages a transmission of the vehicle from a parked stated into a reverse mode, applies power to cause the vehicle to back out of the parking spot while managing steering and braking of the vehicle in order to navigate the vehicle onto the roadway, engages the transmission of the vehicle into a drive mode, applies power and manages steering and braking of the vehicle in order to navigate the vehicle forward on the roadway beyond the parking spot, engages the transmission of the vehicle into the reverse mode, applies power and manages steering of the vehicle to cause the vehicle to back into the parking spot from the roadway and engages the transmission of the vehicle into the parked state comprising a rear-first parking posture.

5. The system of claim 4, wherein the vehicle applies braking responsive to detecting an object proximate to the vehicle in the roadway.

6. The method of claim 5, wherein the program instructions are additionally enabled upon execution, and on condition that braking occurs responsive to detecting the object proximate to the vehicle as the vehicle pulls out of the parking spot, to engage the transmission of the vehicle in drive mode, apply power and manage steering and braking to cause the vehicle to pull back into the parking spot nose: first.

7. A computer program product for delayed parking optimization of an autonomous vehicle, the computer program product comprising a computer readable storage medium having program instructions embodied therewith, wherein the computer readable storage medium is a non-transitory computer readable storage medium, the program instructions executable by a processor to cause the processor to perform a method comprising:

activating a delayed parking optimization mode in the vehicle while the vehicle is already parked in a parking spot in a nose-first parking posture and while one or more passengers are detected in the vehicle; and, during the delayed parking optimization mode, detecting a lack of presence of passengers in the vehicle and, on condition that no passengers are detected in the vehicle, initiating a delay period computed based upon a threshold period of time during which no other vehicles on a roadway are detected in proximity to the vehicle subsequent to which the vehicle engages a transmission of the vehicle from a parked stated into a reverse mode, applies power to cause the vehicle to back out of the parking spot while managing steering and braking of the vehicle in order to navigate the vehicle onto the roadway, engages the transmission of the vehicle into a drive mode, applies power and manages steering and braking of the vehicle in order to navigate the vehicle forward on the roadway beyond the parking spot, engages the transmission of the vehicle into the reverse mode, applies power and manages steering of the vehicle to cause the vehicle to back into the parking spot from the roadway and engages the transmission of the vehicle into the parked state comprising a rear-first parking posture.

8. The computer program product of claim 7, wherein the vehicle applies braking responsive to detecting an object proximate to the vehicle in the roadway.

9. The computer program product of claim 8, wherein on condition that braking occurs responsive to detecting the object proximate to the vehicle as the vehicle pulls out of the parking spot, engaging the transmission of the vehicle in drive mode, applying power and managing steering and braking to cause the vehicle to pull back into the parking spot nose first.

* * * * *